United States Patent Office 3,025,033
Patented Mar. 13, 1962

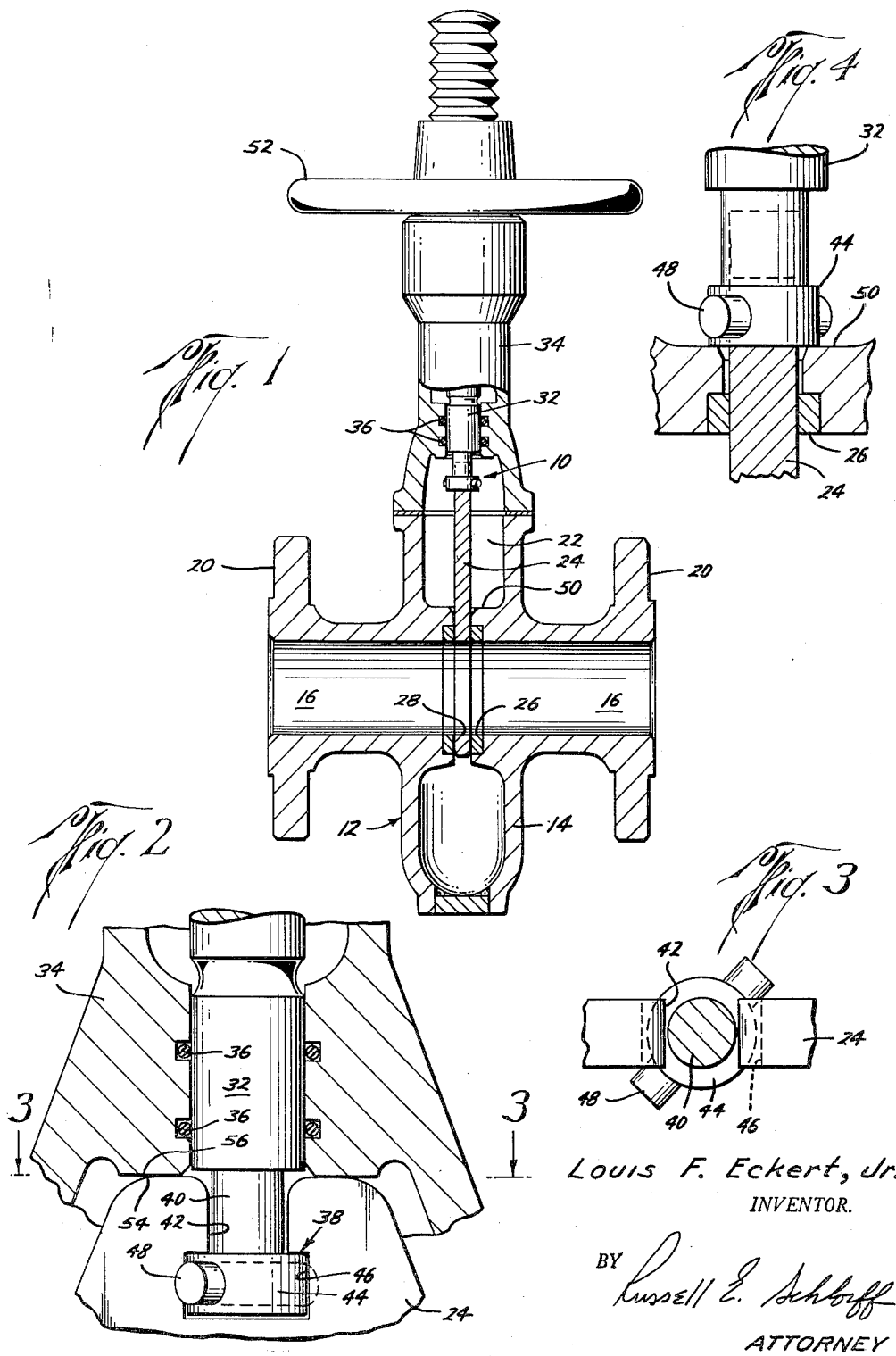
March 13, 1962
L. F. ECKERT, JR
3,025,033
STEM-GATE CONNECTION
Filed April 28, 1959
Louis F. Eckert, Jr.
INVENTOR.
BY
ATTORNEY

3,025,033
STEM-GATE CONNECTION
Louis F. Eckert, Jr., Houston, Tex., assignor to ACF Industries, Incorporated, New York, N.Y., a corporation of New Jersey
Filed Apr. 28, 1959, Ser. No. 809,426
4 Claims. (Cl. 251—84)

This invention relates to gate valves.

More particularly, the invention relates to an improved, economical stem-gate connection for a rising stem, slab gate valve. Slab gates for small size, low pressure valves can be fairly thin (less than one inch) as far as the mechanical requirements are concerned. A common method of forming the stem-gate connection for such thin gates is by a pin-and-slot connection as is disclosed in U.S. Patent 2,000,853. However, due to the type of machining operations involved and the numerous pieces to be handled in assembly, the cost of the connection may be relatively expensive. For thicker gates and higher pressures, the pin-and-slot connection is not practical since stem and pins must, from design requirements, be unduly large. Therefore, for thicker gates, a stem having a square forged end and a gate with a T-slot is quite common; however, the forging is costly.

The present invention provides an improved gate-stem connection which utilizes a T-slot in the gate and a stem having a turned shoulder which mates with the T-slot. The shoulder is provided with a pin that prevents stem rotation. The connection is economical to machine and easy to assemble. Also, by using the improved stem-gate connection in a through conduit valve, the top of the gate itself can be utilized as the stop to properly orient the passage in the gate, and portions of the connection can be used as the gate stop in the closed position.

It is the primary object of the present invention to provide an improved stem-gate connection.

It is another object to provide a through conduit gate valve with a stem-gate connection which will permit the top of the gate to be utilized as the locating point in orienting the passage through the gate.

It is still another object to provide a stem-gate connection which is economical to manufacture and easy to assemble.

It is a further object to provide a stem-gate connection having loose tolerances for efficient machining without sacrificing strength.

It is a further object to provide a novel stem-gate connection for a slab type gate valve which does not bind the gate when the gate is in closed position.

It is a more specific object to provide a stem-gate connection which utilizes a turned stem and T-slot in the gate.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specification, wherein:

FIG. 1 is a front view of a gate valve equipped with the stem-gate connection of the present invention. Certain portions are in section to more fully illustrate the invention.

FIG. 2 is an enlarged sectional view of the stem-gate connection, transverse of FIG. 1.

FIG. 3 is an enlarged sectional view taken generally along lines 3—3 of FIG. 2.

FIG. 4 is an enlarged sectional view as in FIG. 1 showing the gate in the closed position.

Referring now to the drawings, FIG. 1 shows the improved gate and stem connection 10 incorporated in a gate valve 12. The gate valve 12 is comprised of a body 14 having aligned flow passages 16—16. The outer ends of the passages 16—16 are shown terminating in flanges 20—20 permitting the valve 12 to be connected to a flow system. Naturally, any other of the various well known means of finishing ends for connection to a flow system may be utilized.

The interior of the body 14 is provided with a valve chamber 22 to receive a reciprocating gate 24 which cooperates with seats 26 to control the flow as is well known in the art. The gate 24 is provided with a passage 28 which in the open position aligns with the passages 16—16. The upper end of the gate 24 is attached by the novel stem-gate connection 10 to a stem 32. The stem 32 extends through a bonnet 34 and is packed off by O-rings 36.

To form the novel stem-gate connection 10, an inverted T-slot 38 is formed in the gate 24 and the bottom of the stem 32 is provided with a necked portion 40 which mates with the leg 42 of the T-slot 38, a T-head or cylindrical end portion 44 which mates with the cross bar 46 of the T-slot 38, and a pin 48 which prevents rotation of the stem 32.

The T-slot 38 may be flame cut. Since the pin 48 is the part which prevents rotation of the stem, it is not necessary to hold the length of the cross bar 46 of T-slot 38 to a close tolerance; especially since the pin 48 is of sufficient length to take care of normal differences. The neck 40 and cylindrical end portion 44 are made by simple turning operations. In order to assemble the valve, the bonnet 34 may be made up as a complete sub-assembly including the stem 32 and the gate 24 inserted between the seats 26, 26. The bonnet assembly with the stem 32 protruding is brought adjacent the T-slot 38 and the cylindrical end portion 44 slipped into the T-slot 38.

The length of the neck portion 40 of the stem may be proportioned in relation to the leg 42 of the T-slot so that in closing the valve, the load is on the bottom of the T-head portion 44 of the stem and the gate, which provides the greatest amount of bearing area, see FIG. 4. In the closed position, the T-head 44 of the stem 32 contacts the top of seat pad 50 leaving the gate 24 free. This permits the gate to shift to take care of misalignment, out-of-parallelism, etc. On opening, the top of the T-head portion 44 of the stem contacts the portions of the gate which form the leg 42 of the T-slot, see FIG. 2. In order to align the passage 28 of the gate 24 with the passages 16—16 so that there will be a smooth bore through the valve, it is necessary to have a stop which will properly orient the passage 28 each time the valve is operated. By utilizing the present connection 10, the top 54 of the gate 24 can cooperate with a finished abutment 56 in the bonnet 34. Since the gate 24 is solid, the passage 28 will always be stopped at precisely the correct position.

In a rising stem valve, the stem 32 is held stationary while a stem nut connected to a handwheel 52 rotates. With the present connection, there is rotation of approximately a quarter turn before the connection becomes stationary. After the quarter turn rotation, the pin 48 contacts the edges of the T-slot 38 and prevents further rotation of the stem 32. The rotation of the stem nut causes the stem 32 to move up and down to properly position the gate 24. In reversing direction of rotation, the stem 32 will rotate approximately a quarter turn until the pin 48 contacts the other side of the slot 38. Since the point of contact of the pin 48 with the gate is removed from the center line of the gate, the loading resulting from the turning torque is reduced.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A rising stem through conduit slab gate valve comprising a housing having aligned flow passages terminating in a valve chamber, a slab type gate member in said valve chamber provided with a passage which in open position is aligned with the flow passages, a non-rotating stem attached to the gate to move the gate from open to closed position, the connection between the stem and gate comprising a T-slot in the gate and a neck portion and T-head portion on the stem mating with the T-slot, means constituting a part of such connection preventing substantial relative rotation between the stem and gate, the T-head portion being thicker than the gate, the T-head contacting a stop in the valve chamber formed as a portion of the wall surrounding the flow passage to orient the gate in the closed position whereby the gate remains free to shift.

2. A stem-gate connection for a rising stem gate valve comprising a gate formed of a slab of material having at one end an inverted T-slot formed of a leg portion extending inwardly from the end and a cross arm portion extending transversely at the terminus of the leg portion, a cylindrical stem having one end provided with a length of reduced diameter forming a neck portion and a cylindrical end portion for mating with said T-slot, the neck portion being proportioned in relation to the leg of the T-slot so that the cylindrical end portion will contact one side or the other of the cross arm of the T-slot on movement of the stem, and the cylindrical end portion provided with a pin having ends which extend therethrough to contact the surfaces of the gate adjacent to the T-slot to prevent rotation of the stem in either direction past such contact.

3. A rising stem through conduit slab gate valve comprising a housing having opposed aligned flow passages terminating in a valve chamber, a slab type gate member in said valve chamber provided with a passage which in open position is aligned with the flow passages, a stem attached to one end of the gate to move the gate from open to closed position, the connection between the stem and gate comprising a T-slot in the gate and a neck portion and T-head portion on the stem mating with the T-slot, the T-head portion having a pin extending therethrough the ends of which contact the surfaces of the gate adjacent the T-slot to hold the stem non-rotative, the stem passing through a bonnet, the bonnet being provided with a stop which engages the end of the gate to which the stem is connected to align the passage of the gate with the flow passages in the open position, the valve chamber being provided with a stop which engages the T-head portion of the stem in the closed position which while orienting the gate allows it to remain relatively free to shift.

4. A stem-gate connection for a rising stem gate valve comprising a gate formed of a slab of material having an inverted T-slot at one end formed of a leg portion extending from the end and a cross arm portion extending transversely to the leg portion, a cylindrical stem, said stem having a reduced portion axially removed from one end and a cylindrical end portion, said reduced portion being of a diameter and so positioned that it can be inserted in the leg portion of the inverted T-slot of the gate, the cylindrical end portion of the stem being proportioned to be inserted in the cross arm portion of the inverted T-slot and provided with a transverse pin having ends which extend past the surface of the cylindrical head portion to contact the gate adjacent the cross arm portion of the T-slot to prevent rotation of the stem in either direction past such contact.

References Cited in the file of this patent

UNITED STATES PATENTS

| | | |
|---|---|---|
| 205,626 | Frost | July 2, 1878 |
| 891,062 | Hansen | June 16, 1908 |
| 2,656,143 | Fantz | Oct. 20, 1953 |
| 2,816,730 | Rabas | Dec. 17, 1957 |
| 2,838,066 | Harris | June 10, 1958 |
| 2,905,192 | Velan | Sept. 22, 1959 |

FOREIGN PATENTS

| | | |
|---|---|---|
| 374,067 | Italy | Aug. 12, 1939 |
| 529,133 | Italy | June 20, 1955 |